United States Patent
Saito et al.

(10) Patent No.: US 8,783,129 B2
(45) Date of Patent: Jul. 22, 2014

(54) ACCELERATOR APPARATUS

(75) Inventors: Takehiro Saito, Kariya (JP); Haruhiko Suzuki, Anjo (JP); Takashi Hamaoka, Kariya (JP); Yoshinori Inuzuka, Okazaki (JP)

(73) Assignee: Denso Corporation, Kariya (JP)

( * ) Notice: Subject to any disclaimer, the term of this patent is extended or adjusted under 35 U.S.C. 154(b) by 498 days.

(21) Appl. No.: 13/211,583

(22) Filed: Aug. 17, 2011

(65) Prior Publication Data

US 2012/0060638 A1    Mar. 15, 2012

(30) Foreign Application Priority Data

Sep. 14, 2010    (JP) ................................. 2010-205732
Feb. 14, 2011    (JP) .................................... 2011-28274

(51) Int. Cl.
     *G05G 1/30*      (2008.04)

(52) U.S. Cl.
     USPC .............................................. 74/513; 74/560

(58) Field of Classification Search
     CPC ............ G05G 1/30; G05G 1/38; G05G 1/445
     USPC .......................................... 74/512–514, 560
     IPC ................................................ G05G 1/30, 1/38
     See application file for complete search history.

(56) References Cited

U.S. PATENT DOCUMENTS

| | | | |
|---|---|---|---|
| 6,857,336 B2* | 2/2005 | Staker | 74/513 |
| 2004/0149070 A1* | 8/2004 | Solta | 74/513 |
| 2010/0077886 A1* | 4/2010 | Seiltz et al. | 74/513 |
| 2011/0100153 A1* | 5/2011 | Kaijala et al. | 74/512 |

FOREIGN PATENT DOCUMENTS

| | | | | |
|---|---|---|---|---|
| JP | 2-164632 | 6/1990 | | |
| JP | 5-76865 | 10/1993 | | |
| JP | P2003-211994 A | 7/2003 | | |
| JP | 2004-108214 | 4/2004 | | |
| JP | 2007299137 A | * | 11/2007 | G05G 1/14 |

OTHER PUBLICATIONS

Office Action (6 pages) dated Nov. 4, 2013, issued in corresponding Chinese Application No. 201110281202.4 and English translation (4 pages).
Japanese Office Action dated Aug. 21, 2012, issued in corresponding Japanese Application No. 2011-028274 with English translation.

* cited by examiner

*Primary Examiner* — Thomas Diaz
(74) *Attorney, Agent, or Firm* — Nixon & Vanderhye PC

(57) ABSTRACT

A limiting portion of a support member, which rotatably supports an accelerator pedal, forms a gap between a contacting portion of the accelerator pedal and the limiting portion in a state where the accelerator pedal is rotated in a depressing direction. A cover member is provided to one of the support member and the accelerator pedal and covers the gap at any rotational position of the accelerator pedal within a rotatable range of the accelerator pedal.

7 Claims, 10 Drawing Sheets

ACCELERATOR APPARATUS

CROSS REFERENCE TO RELATED APPLICATION

This application is based on and incorporates herein by reference Japanese Patent Application No. 2010-205732 filed on Sep. 14, 2010 and Japanese Patent Application No. 2011-28274 filed on Feb. 14, 2011.

BACKGROUND OF THE INVENTION

1. Field of the Invention

The present invention relates to an accelerator apparatus for a vehicle.

2. Description of Related Art

For instance, JP2004-108214A teaches an accelerator apparatus, which controls an acceleration state of a vehicle based on the amount of depression of an accelerator pedal, which is depressed by a foot of a driver of the vehicle. In this accelerator apparatus, the accelerator pedal is rotatably supported by a support member, which is installed to the vehicle, and the accelerator pedal is urged by an urging member in a direction opposite from a depressing direction of the accelerator pedal. When a contacting portion of the accelerator pedal contacts a limiting portion (pedal stopper) of the support member upon releasing of the accelerator pedal, the rotation of the accelerator pedal in the direction opposite from the depressing direction is limited. Therefore, when the driver does not depress the accelerator pedal, a rotational position of the accelerator pedal is held in a full close position (a rotational position of the accelerator pedal, at which a throttle valve is fully closed), i.e., a position, in which an acceleration command is not outputted from the accelerator apparatus.

In addition, the accelerator apparatus described in JP2004-108214A has a cover portion, which can cover a gap between the contacting portion and the limiting portion of the support member, so that it is possible to limit intrusion of foreign objects (e.g., sand, pebble) into the gap.

In the accelerator apparatus described in JP2004-108214A, when the rotational position of the accelerator pedal is at or adjacent to the full close position, the gap can be covered with the cover portion. However, when the accelerator pedal is rotated in the depressing direction from the full close position by a predetermined amount, the gap cannot be covered with the cover portion. With the above described structure, when the accelerator pedal is depressed by the foot of the driver through his/her shoe, foreign objects (e.g., sand, pebble), which adhere to, i.e., are attached to the shoe of the driver, will possibly be introduced into the gap. When the foreign objects are intruded into the gap and are caught between the limiting portion and the contacting portion, the accelerator pedal is jammed and cannot be returned to the full close position after releasing of the accelerator pedal. Therefore, in such a case, the accelerator pedal is placed in a jammed state, in which the accelerator pedal is kept in the depressed position in the absence of the application of the depressing force from the foot of the driver onto the accelerator pedal. As a result, the vehicle is held in the accelerated state or in the state where the deceleration of the vehicle is impossible. Thus, the driver will possibly feel anxiety and/or unsafe.

SUMMARY OF THE INVENTION

The present invention addresses the above disadvantages. According to the present invention, there is provided an accelerator apparatus for a vehicle. The accelerator apparatus includes an accelerator pedal, a support member, an urging member, a rotational position sensor and a cover member. The accelerator pedal is adapted to be depressed in a depressing direction by a driver of the vehicle. The support member is adapted to be installed to the vehicle and rotatably supports the accelerator pedal. The support member includes a limiting portion that limits rotation of the accelerator pedal in an opposite direction, which is opposite from the depressing direction, when a contacting portion of the accelerator pedal contacts the limiting portion. The limiting portion forms a gap between the contacting portion and the limiting portion in a state where the accelerator pedal is rotated in the depressing direction. The urging member urges the accelerator pedal in the opposite direction, which is opposite from the depressing direction. The rotational position sensor senses a rotational position of the accelerator pedal. The cover member is provided to one of the support member and the accelerator pedal and covers the gap at any rotational position of the accelerator pedal within a rotatable range of the accelerator pedal.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
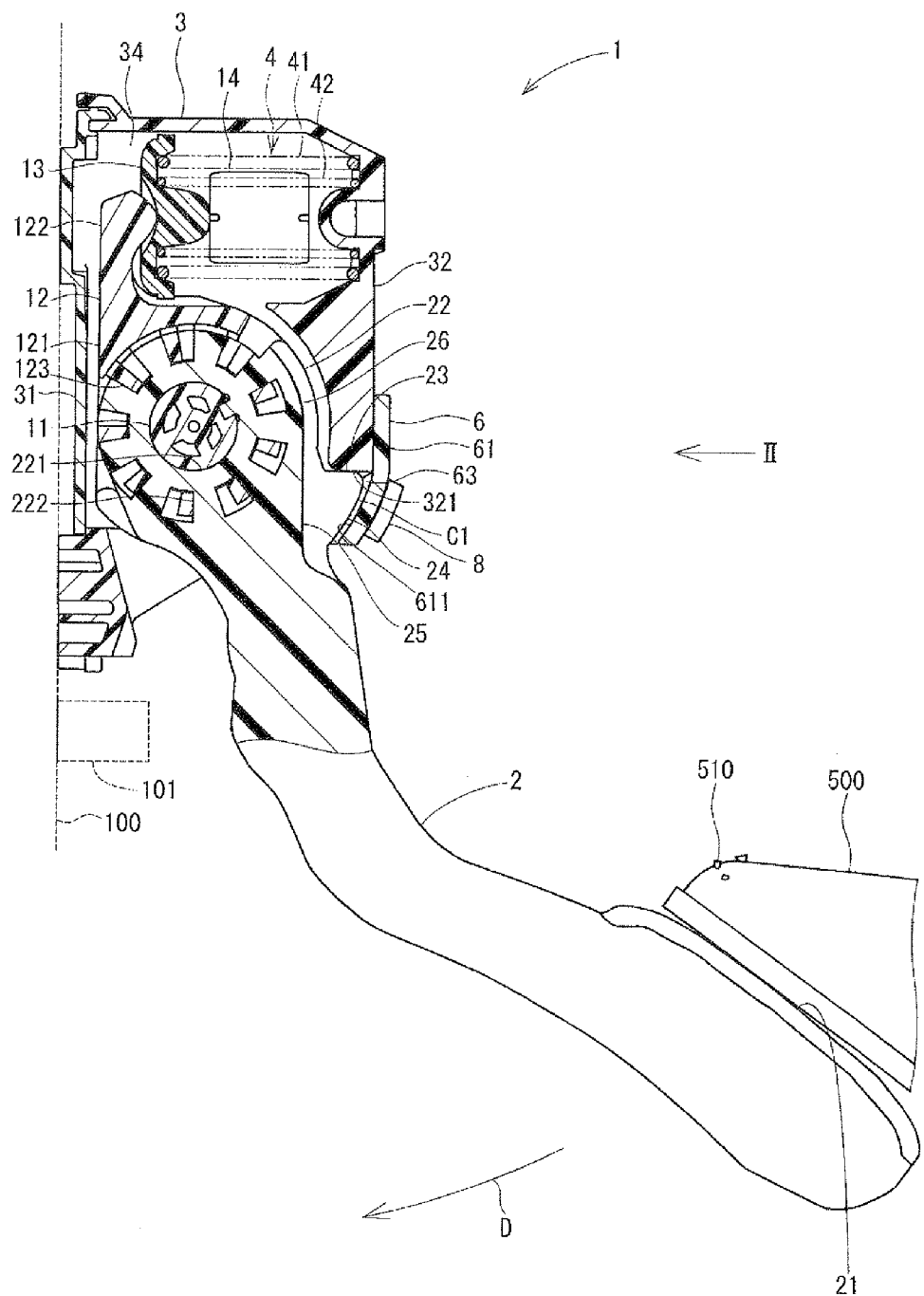
FIG. 1 is a cross-sectional view of an accelerator apparatus according to a first embodiment of the present invention, showing a state where an accelerator pedal is placed in a full close position.

An accelerator apparatus of each of various embodiments of the present invention will be described with reference to the accompanying drawings. In the following embodiments, similar components will be indicated by the same reference numerals and will not be described redundantly for the sake of simplicity.

(First Embodiment)

FIGS. 1 to 4 show an accelerator apparatus according to a first embodiment of the present invention.

Figure 2:
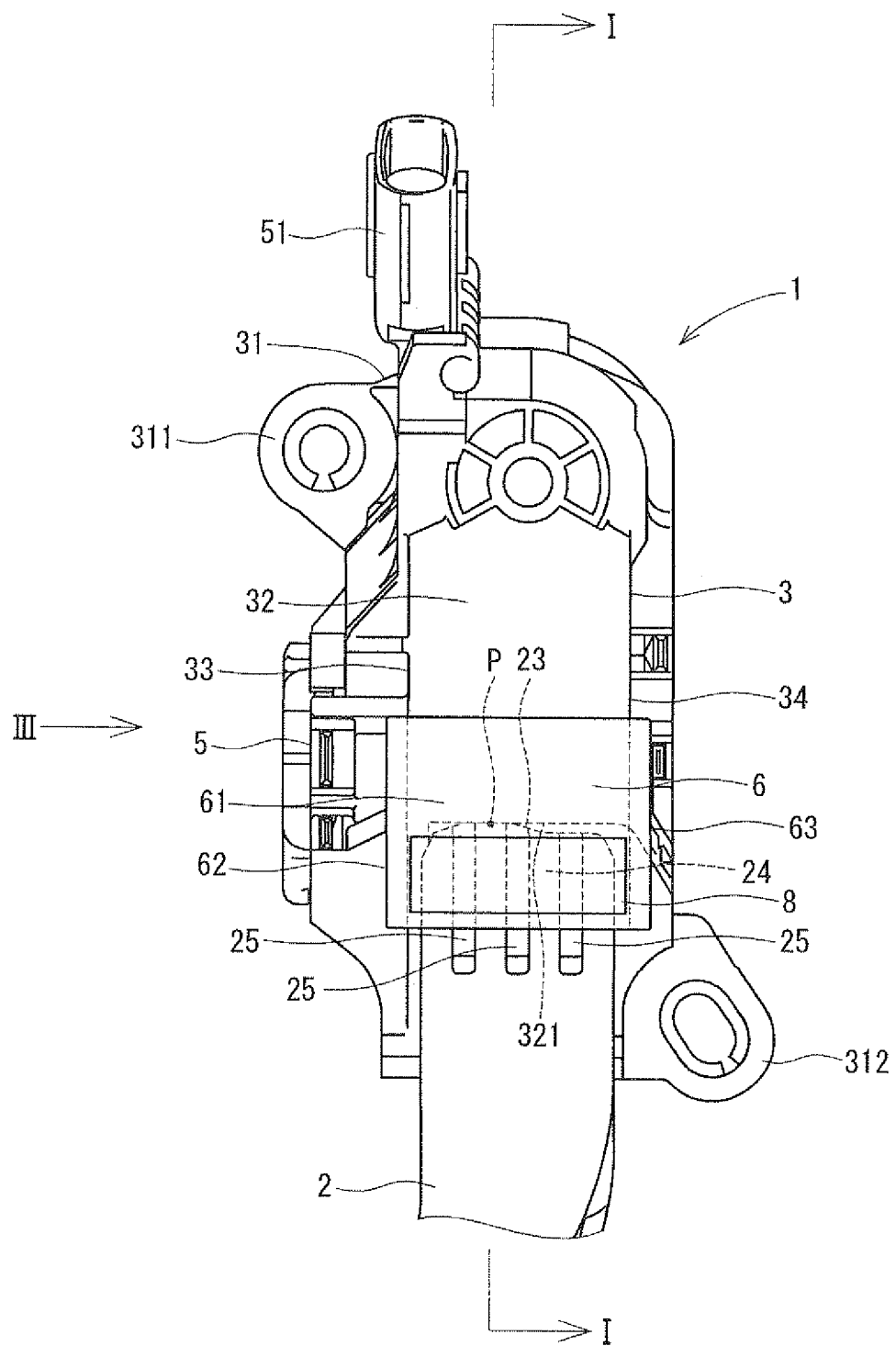
FIG. 2 is a view taken in a direction of an arrow II in FIG. 1.
Figure 3:
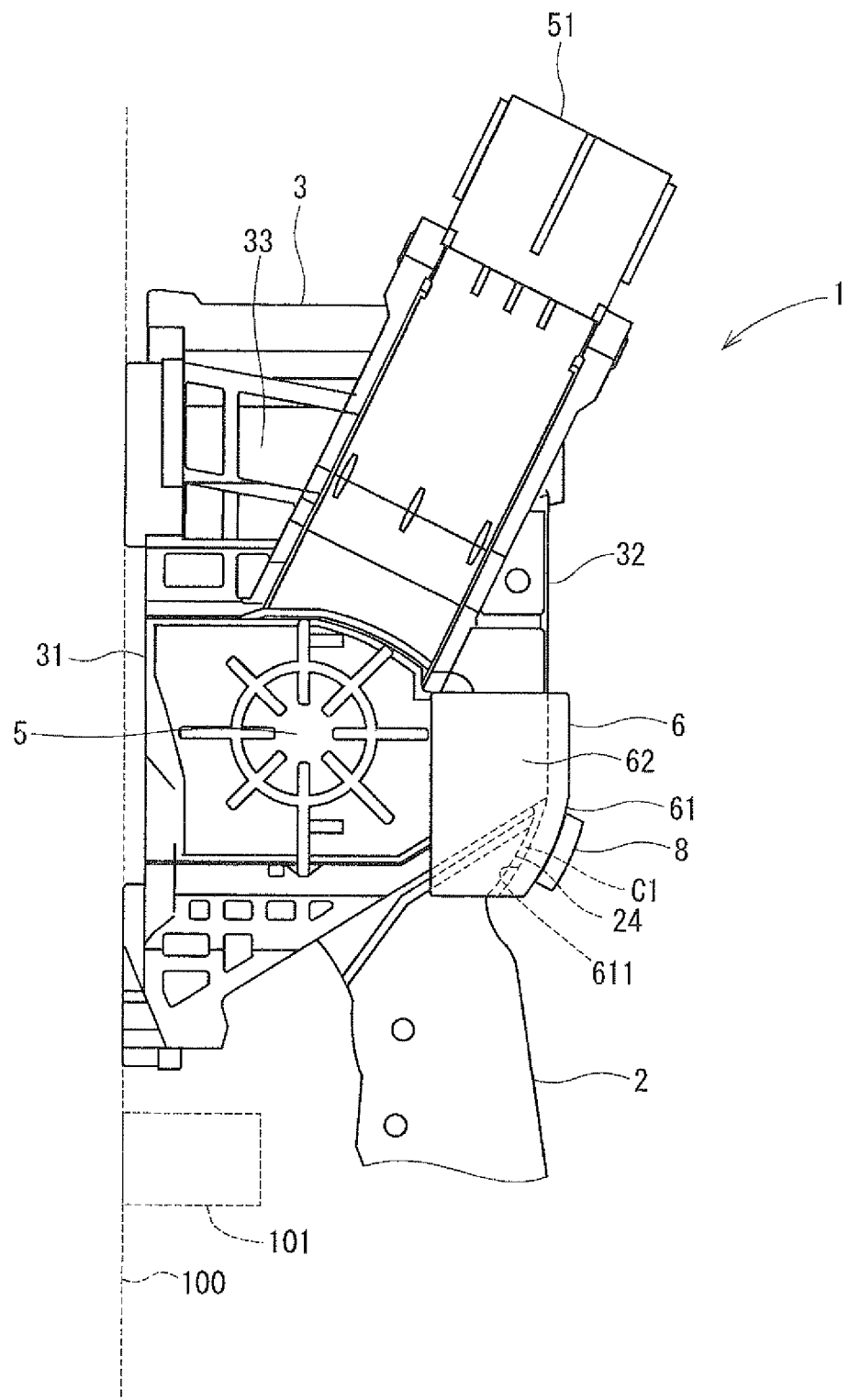
FIG. 3 is a view taken in a direction of an arrow III in FIG. 2.

As shown in FIGS. 1 to 3, the accelerator apparatus 1 has an accelerator pedal 2, a support member 3, an urging member 4, a rotational position sensor 5 and a cover member 6. The accelerator apparatus 1 is installed to a vehicle (e.g., an automobile) and controls an acceleration state of the vehicle based on the amount of depression of the accelerator pedal 2, which is depressed by a foot of a driver of the vehicle. The accelerator apparatus 1 of the present embodiment uses an axel-by-wire, and the accelerator pedal 2 is thereby not mechanically connected to a throttle apparatus of the vehicle. The accelerator apparatus 1 outputs information (electric signal) of a rotational position of the accelerator pedal 2 to an electronic control unit (ECU) of the vehicle, and the ECU controls the throttle apparatus based on the information of the rotational position received from the accelerator apparatus 1. Thereby, the acceleration state of the vehicle is controlled.

A basic structure of the accelerator apparatus 1 will be described below with reference to FIGS. 1 to 3.

The accelerator pedal 2 is made of, for example, a resin material and is configured generally into an elongated body. The accelerator pedal 2 includes a pad 21 at one end thereof and a rotatable shaft portion 22 at the other end thereof. In addition, the accelerator pedal 2 has a contacting portion 23 at a location adjacent to the rotatable shaft portion 22. In the present embodiment, the pad 21, the rotatable shaft portion 22 and the contacting portion 23 are integrally formed together.

The support member 3 is made of, for example, a resin material. The support member 3 has a bottom plate 31, a top plate 32 and two side plates 33, 34. The bottom plate 31 and the top plate 32 are arranged generally parallel to each other (see FIG. 1). The side plate 33 and the side plate 34 are arranged generally parallel to each other (see FIG. 2), and the bottom plate 31 and the top plate 32 are connected together by the side plates 33, 34. Therefore, the support member 3 is configured into a box form.

As shown in FIG. 2, mounting portions 311, 312 are formed in the bottom plate 31. The support member 3 is installed to the vehicle by fixing the mounting portions 311, 312 to the vehicle with fasteners, such as bolts. As shown in FIG. 1, the support member 3 is installed to a wall surface 100, which is located at a lower side of a driver's seat of the vehicle, such that the wall surface 100 and the bottom plate 31 are generally parallel to each other. In the present embodiment, it is assumed that the wall surface 100 is formed as a planar wall surface, which extends along an imaginary straight line that is generally parallel to a vertical direction.

Furthermore, a limiting portion 321 is formed in the top plate 32 of the support member 3.

A hole 221 extends through the rotatable shaft portion 22 of the accelerator pedal 2, and a shaft member 11 is received through the hole 221. Two opposed end portions of the shaft member 11, which are opposed to each other, are rotatably supported by the side plate 33 and the side plate 34, respectively, of the support member 3. The shaft member 11 and the rotatable shaft portion 22 are formed such that the shaft member 11 and the rotatable shaft portion 22 are not rotatable relative to each other. Thereby, the accelerator pedal 2 is integrally rotatable with the shaft member 11 about a central axis of the shaft member 11. As described above, the accelerator pedal 2 is rotatably supported by the side plate 33 and the side plate 34 of the support member 3.

As shown in FIG. 1, a rotor 12 is provided on a side of the accelerator pedal 2, which is opposite from the pad 21, i.e., on the rotatable shaft portion 22 side of the accelerator pedal 2. The rotor 12 is made of, for example, a resin material and has an annular portion 121 and a projecting portion 122. The annular portion 121 is configured to have a generally annular form. The projecting portion 122 projects from the annular portion 121 in a radial direction of the annular portion 121. The annular portion 121 is provided between the rotatable shaft portion 22 of the accelerator pedal 2 and the side plate 34 of the support member 3. The shaft member 11 is received through the hole 221 of the annular portion 121, and the annular portion 121 is rotatably supported by the shaft member 11. The annular portion 121 and the shaft member 11 are rotatable relative to each other.

A plurality of bevel teeth 123, each of which has a tilted surface, is formed in a rotatable shaft portion 22 side surface of the annular portion 121 such that the bevel teeth 123 are arranged one after another in a circumferential direction. A plurality of bevel teeth 222, which correspond to the bevel teeth 123, is formed in an annular portion 121 side surface of the rotatable shaft portion 22. Thereby, when the pad 21 of the accelerator pedal 2 is depressed by the foot of the driver to rotate the rotatable shaft portion 22, the tilted surfaces of the bevel teeth 222 and the tilted surfaces of the bevel teeth 123 are engaged with each other. When the rotatable shaft portion 22 is further rotated, the annular portion 121 is rotated together with the rotatable shaft portion 22 and is urged by the bevel teeth 222 toward the side plate 34. A friction plate (not shown) is provided between the annular portion 121 and the side plate 34. Therefore, a frictional force, which corresponds to the rotational position of the accelerator pedal 2, is applied to a friction plate side surface of the annular portion 121.

A holder 13, which is made of a resin material and is configured into a dish form, is provided on a top plate 32 side of a distal end part of the projecting portion 122. The urging member 4 is provided between the holder 13 and the top plate 32. The urging member 4 includes a first spring 41 and a second spring 42. The first spring 41 and the second spring 42 are formed as coil springs, respectively. A diameter of the second spring 42 is smaller than a diameter of the first spring 41, and thereby the second spring 42 is placed radially inward of the first spring 41. Therefore, in the present embodiment, the urging member 4 has a double-spring structure.

The first spring 41 and the second spring 42 cooperate together to exert a spring force in the axial direction to urge the holder 13 against the projecting portion 122. Thereby, the projecting portion 122 of the rotor 12 is urged toward the bottom plate 31, so that the annular portion 121 is rotated. When the annular portion 121 is rotated, the rotatable shaft portion 22, which has the bevel teeth 222 engaged with the bevel teeth 123, is rotated. This rotational direction of the rotatable shaft portion 22 is opposite from the rotational direction (depressing direction) D of the accelerator pedal 2, in which the accelerator pedal 2 is rotated at the time of depressing the accelerator pedal 2 with the foot of the driver. Thus, the urging member 4 urges the accelerator pedal 2 in the direction opposite from the depressing direction D of the accelerator pedal 2, in which the accelerator pedal 2 is rotated at the time of depressing the accelerator pedal 2 with the foot of the driver.

A damper 14, which is configured into a cylindrical tubular body, is installed between the first spring 41 and the second spring 42. The damper 14 is made of an elastic material, such as rubber. The damper 14 can limit generation of vibrations and noises at the first and second springs 41, 42.

As shown in FIGS. 2 and 3, the rotational position sensor 5 is provided in the side plate 33 of the support member 3. The rotational position sensor 5 has a Hall IC (not shown). The Hall IC is provided at a location, which is adjacent to a side plate 33 side end portion of the shaft member 11. A magnet (not shown) is fixed to the side plate 33 side end portion of the shaft member 11. When the accelerator pedal 2 is rotated, the shaft member 11 and the magnet are rotated together with the accelerator pedal 2, so that a magnetic field changes around the end portion of the shaft member 11. The Hall IC of the rotational position sensor 5 converts the change in the magnetic field into a corresponding electric signal and outputs the electric signal to the ECU through the connector 51. Thereby, the ECU can sense the rotational position of the accelerator pedal 2. Therefore, the rotational position sensor 5 is used to sense the rotational position of the accelerator pedal 2.

As described above, the accelerator pedal 2 is urged by the urging member 4 in the direction opposite from the depressing direction D of the accelerator pedal 2.

Therefore, as shown in FIG. 1, in the non-depressed state of the accelerator pedal 2, the accelerator pedal 2 is urged by the urging member 4, so that the contacting portion 23 contacts the limiting portion 321. Thus, the accelerator pedal 2 is held in a corresponding predetermined rotational position (full close position). At this time, the limiting portion 321 limits the rotation of the accelerator pedal 2 in the direction opposite from the depressing direction D of the accelerator pedal 2. Furthermore, at this time, the output (electric signal), which is outputted from the rotational position sensor 5 and indicates the rotational position of the accelerator pedal 2, is, for instance, 0 (zero).

Figure 4:
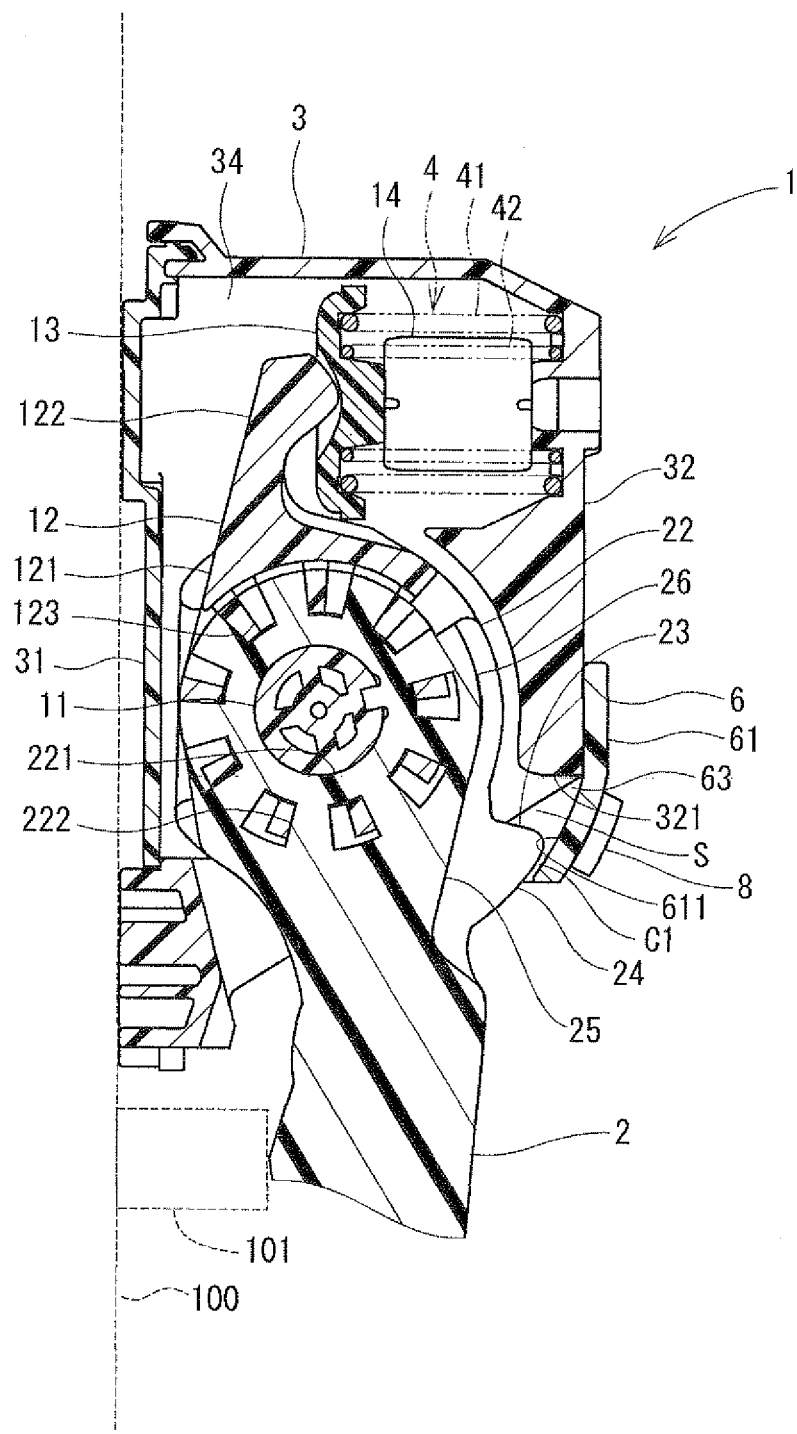
FIG. 4 is a cross-sectional view of the accelerator apparatus of the first embodiment, showing the accelerator pedal held in a full open position.
Figure 5A:
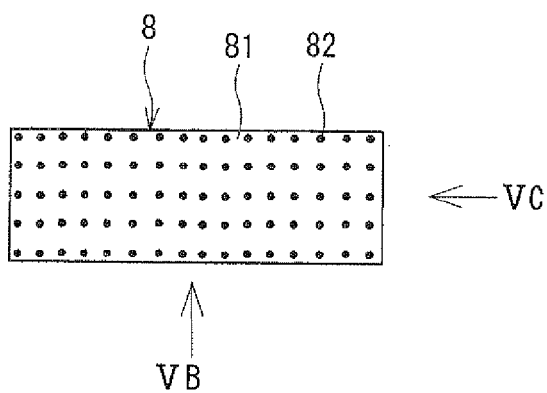
FIG. 5A is a top view of a cleaning member of the accelerator apparatus of the first embodiment.
Figure 5C:
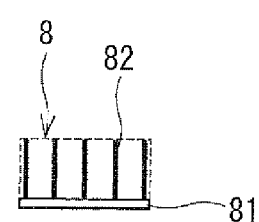
FIG. 5C is a side view of the cleaning member shown in FIGS. 5A and 5B.
Figure 5B:
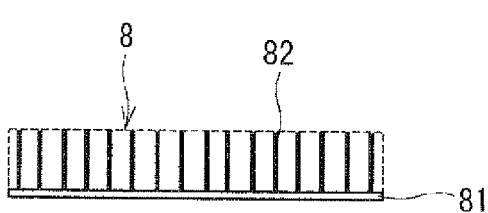
FIG. 5B is a front view of the cleaning member shown in FIG. 5A.
Figure 5D:
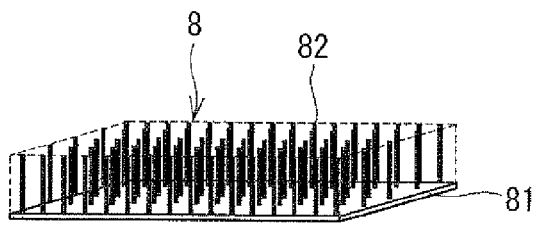
FIG. 5D is a perspective view of the cleaning member shown in FIGS. 5A to 5C.

In contrast, as show in FIG. 4, in a fully depressed state of the accelerator pedal 2, in which the accelerator pedal 2 is fully depressed by the foot of the driver, the accelerator pedal 2 contacts a stopper 101, which is installed to the wall surface 100 of the vehicle. Thus, the accelerator pedal 2 is held in a corresponding predetermined rotational position (full open position). At this time, the stopper 101 limits the rotation of the accelerator pedal 2 in the depressing direction D.

As described above, the accelerator pedal 2 is rotatable from the position (full close position), at which the contacting portion 23 of the accelerator pedal 2 contacts the limiting portion 321, to the position (full open position), at which the accelerator pedal 2 contacts the stopper 101. Specifically, the range from the full close position to full open position is the rotatable range of the accelerator pedal 2. Here, in a state where the accelerator pedal is rotated in the depressing direction D from the full close position, a gap S is formed between the limiting portion 321 and the contacting portion 23 (see FIG. 4). A size of the gap S is changed in response to the amount of rotation of the accelerator pedal 2.

The cover member 6 is installed to, i.e., is provided to the support member 3 such that the cover member 6 covers the gap S between the limiting portion 321 and the contacting portion 23 at any rotational position of the accelerator pedal 2 within the rotatable range of the accelerator pedal 2. More specifically, the cover member 6 is made of, for example, a resin material. The cover member 6 has a base portion 61 and two side portions 62, 63. The side portion 62 and the side portion 63 are opposed to each other and extend straight from the base portion 61 (see FIGS. 1 to 3).

The cover member 6 is installed to the support member 3 as follows. That is, a portion of an inner wall of the side portion 62 contacts the side plate 33 of the support member 3, and a portion of an inner wall of the side portion 63 contacts the side plate 34 of the support member 3. Furthermore, a portion of an inner wall of the base portion 61 contacts the top plate 32 of the support member 3.

In the present embodiment, the base portion 61 of the cover member 6 has a curved inner wall surface 611, which generally coincides with an imaginary cylindrical surface, which arcuately extends about the rotational axis of the accelerator pedal 2 (the shaft member 11). In contrast, the accelerator pedal 2 has a curved outer wall surface 24 at a location, which is adjacent to the contacting portion 23. The curved outer wall surface 24 is formed such that a predetermined clearance C1 is provided between the curved outer wall surface 24 and the curved inner wall surface 611 at any rotational position of the accelerator pedal 2 within the rotatable range of the accelerator pedal 2 (see FIGS. 1, 3 and 4).

The cover member 6 can limit the intrusion of the foreign objects into the gap S from all of the top plate 32 side, the side plate 33 side and the side plate 34 side throughout the entire rotatable range of the accelerator pedal 2.

Furthermore, in the present embodiment, the accelerator pedal 2 has a plurality of grooves 25 (see FIG. 2). The grooves 25 extend from an opposed surface of the contacting portion 23, which is opposed to the limiting portion 321 of the support member 3, in a direction that is opposite from the limiting portion 321 and is away from the limiting portion 321 (i.e., in the downward direction in FIG. 2). In the present embodiment, the number of the grooves 25 is three.

The grooves 25 are arranged such that at least an opposite end portion of each groove 25, which is opposite from the limiting portion 321, is exposed from the cover member 6 at any rotational position of the accelerator pedal 2 within the rotatable range of the accelerator pedal 2 (see FIGS. 1, 2 and 4).

Furthermore, each groove 25 is connected to a groove 26, which extends from the contacting portion 23 of the accelerator pedal 2 toward the projecting portion 122 of the rotor 12 (see FIGS. 1 and 4). In this way, the abrasive particles, which are generated in, for example, an inside of the support member 3, can be guided to the groove 25 through the groove 26.

Furthermore, in the present embodiment, the opposed surface of the contacting portion 23, which is opposed to the limiting portion 321, is configured such that a lateral side portion of the opposed surface of the contacting portion 23, which is located on the side where the side plate 33 is located, curves and slightly projects toward the limiting portion 321 (see FIG. 2). Thereby, a contacting point P between the contacting portion 23 and the limiting portion 321 can be placed to a location, which is adjacent to the rotational position sensor 5. Thereby, the rotational position of the accelerator pedal 2 can be more accurately sensed with the rotational position sensor 5.

In the present embodiment, as shown in FIG. 4, a cleaning member 8 is installed to an opposite surface of the cover member 6, which is opposite from the gap S. As shown in FIG. 5, the cleaning member 8 of the present embodiment is a brush, which is configured into an oblong rectangular body. Specifically, the cleaning member 8 has a base 81, which is configured into an oblong rectangular sheet form, and a plurality of brush bristles 82. Each brush bristle 82 is made of, for example, a resin material and is resiliently deformable. The brush bristles 82 are arranged in rows and columns on one surface of the base 81 and are generally equally spaced from each other, and each brush bristle 82 extends in a direction generally perpendicular to a plane of the one surface of the base 81. In the cleaning member 8, the other surface of the base 81, which is opposite from the brush bristles 82, is coated with a bonding agent and is bonded to the cover member 6. In the cleaning member 8 of the present embodiment, for example, a width of the base 81 (thereby a width of the clearing member 8), which is measured in a width direction (a top-to-bottom direction in FIG. 2) of the base 81, is about 7 mm. A length of the base 81 (thereby a length of the cleaning member 8), which is measured in a longitudinal direction (a left-to-right direction in FIG. 2) of the base 81, is about 20 mm. Furthermore, a length (a height from the base 81) of each brush bristle 82 is about 5 mm.

As discussed above, in the present embodiment, the cleaning member 8, which is formed as the brush, is installed to the cover member 6. Thereby, as shown in FIG. 1, even in the case where the foreign objects (e.g., sand, pebble) 510 adhere to, i.e., are attached to the shoe 500 of the driver, when the shoe 500 contacts the cleaning member 8, the foreign objects 510 are scraped off from the shoe 500 by the cleaning member 8.

As described above, in the present embodiment, the cover member 6 is installed to the support member 3 such that the cover member 6 covers the gap S between the limiting portion 321 and the contacting portion 23 at any rotational position of the accelerator pedal 2 within the rotatable range of the accelerator pedal 2. When the driver depresses the accelerator pedal 2 with his/her foot through his/her shoe, the cover member 6 limits the intrusion of the foreign objects (e.g., the sand and/or the pebble), which adhere to the shoe of the driver, into the gap S throughout the entire rotatable range of the accelerator pedal 2. Thereby, the capturing of the foreign objects between the limiting portion 321 of the support member 3 and the contacting portion 23 of the accelerator pedal 2 is limited. Therefore, it is possible to limit the occurrence of the jammed state of the accelerator pedal 2, in which the accelerator pedal 2 is kept in the depressed position in the absence of the application of the depressing force from the foot of the driver onto the accelerator pedal 2. Thereby, it is possible to improve the safety of the accelerator apparatus 1.

In the present embodiment, the cover member 6 has the curved inner wall surface 611, which generally coincides with the imaginary cylindrical surface, which arcuately extends about the rotational axis of the accelerator pedal 2. In contrast, the accelerator pedal 2 has the curved outer wall surface 24 at the location, which is adjacent to the contacting portion 23. The curved outer wall surface 24 is formed such that the predetermined clearance C1 is provided between the curved outer wall surface 24 and the curved inner wall surface 611 at any rotational position of the accelerator pedal 2 within the rotatable range of the accelerator pedal 2. With the above structure, the cover member 6 can effectively limit the intrusion of the foreign objects between the contacting portion 23 of the accelerator pedal 2 and the limiting portion 321 of the support member 3 throughout the entire rotatable range of the accelerator pedal 2. Furthermore, the rotation of the accelerator pedal 2 can be smoothened by the provision of the clearance C1

Furthermore, in the present embodiment, the accelerator pedal 2 has the grooves 25 that extend from the opposed surface of the contacting portion 23, which is opposed to the limiting portion 321 of the support member 3, in the direction that is opposite from the limiting portion 321 and is away from the limiting portion 321. Thereby, even when the foreign objects are introduced between the contacting portion 23 and the limiting portion 321, the foreign objects can be received into the grooves 25. Therefore, the capturing of the foreign objects between the contacting portion 23 and the limiting portion 321 can be limited.

In the present embodiment, the grooves 25 are arranged such that at least the opposite end portion of each groove 25, which is opposite from the limiting portion 321, is exposed from the cover member 6 at any rotational position of the accelerator pedal 2 within the rotatable range of the accelerator pedal 2. Thereby, even when the foreign objects are accumulated in the grooves 25, the foreign objects can be expelled from the grooves 25 through the exposed portions of the grooves 25, which are exposed from the cover member 6.

Furthermore, in the present embodiment, the multiple grooves 25 are formed. Therefore, the capturing of the foreign objects between the contacting portion 23 and the limiting portion 321 can be more effectively limited.

Also, in the present embodiment, the cleaning member 8 is installed to the opposite surface of the cover member 6, which is opposite from the gap S. The cleaning member 8 can scrape off the foreign objects that adhere to the manipulating portion (the shoe in the present embodiment) of the driver, through which the driver manipulates the accelerator pedal 2. The cleaning member 8 has the brush bristles 82. Specifically, in the present embodiment, the cleaning member 8 is formed as the brush. Thereby, even when the foreign objects (e.g., sand, pebble) 510 adhere to the shoe 500 of the driver, the foreign objects 510 can be scraped off from the shoe 500 by the cleaning member 8. Therefore, the capturing of the foreign objects between the contacting portion 23 and the limiting portion 321 can be more effectively limited.

(Second Embodiment)

Figure 6:
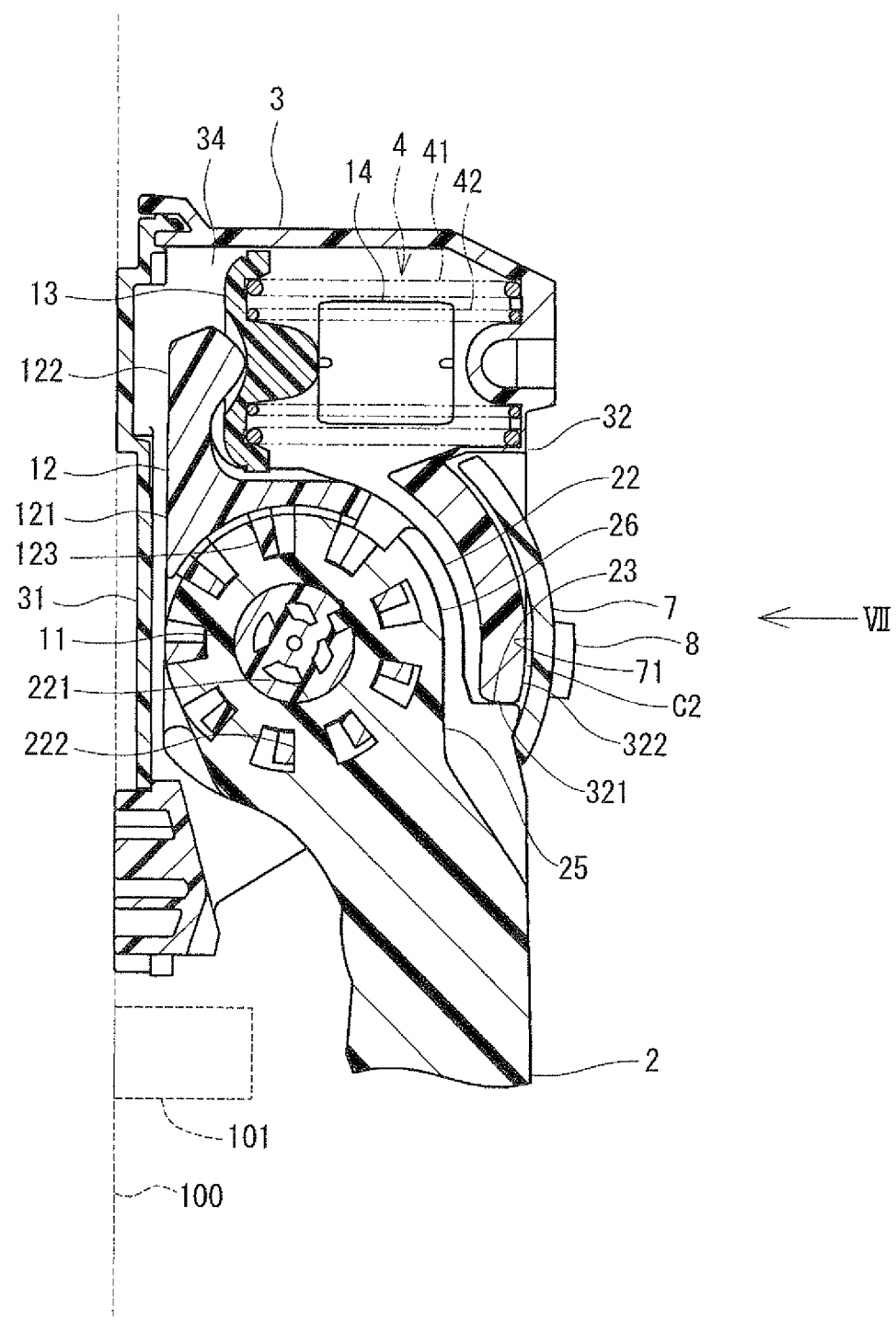
FIG. 6 is a cross-sectional view of an accelerator apparatus according to a second embodiment of the present invention, showing a state where an accelerator pedal is placed in a full close position.

FIG. 6 shows an accelerator apparatus according to a second embodiment of the present invention. In the second embodiment, the location and the shape of the cover member are different from those of the first embodiment.

In the second embodiment, the cover member 7 is installed to the accelerator pedal 2 such that the cover member 7 covers the gap S between the limiting portion 321 and the contacting portion 23 at any rotational position of the accelerator pedal 2 within the rotatable range of the accelerator pedal 2. More specifically, the cover member 7 is made of, for example, a resin material. The cover member 7 is configured into a curved plate form. The cover member 7 is installed to, i.e., is provided to the accelerator pedal 2 such that one end portion of the cover member 7 is fixed to a portion of the accelerator pedal 2, which is located adjacent to the contacting portion 23 of the accelerator pedal 2.

Figure 8:
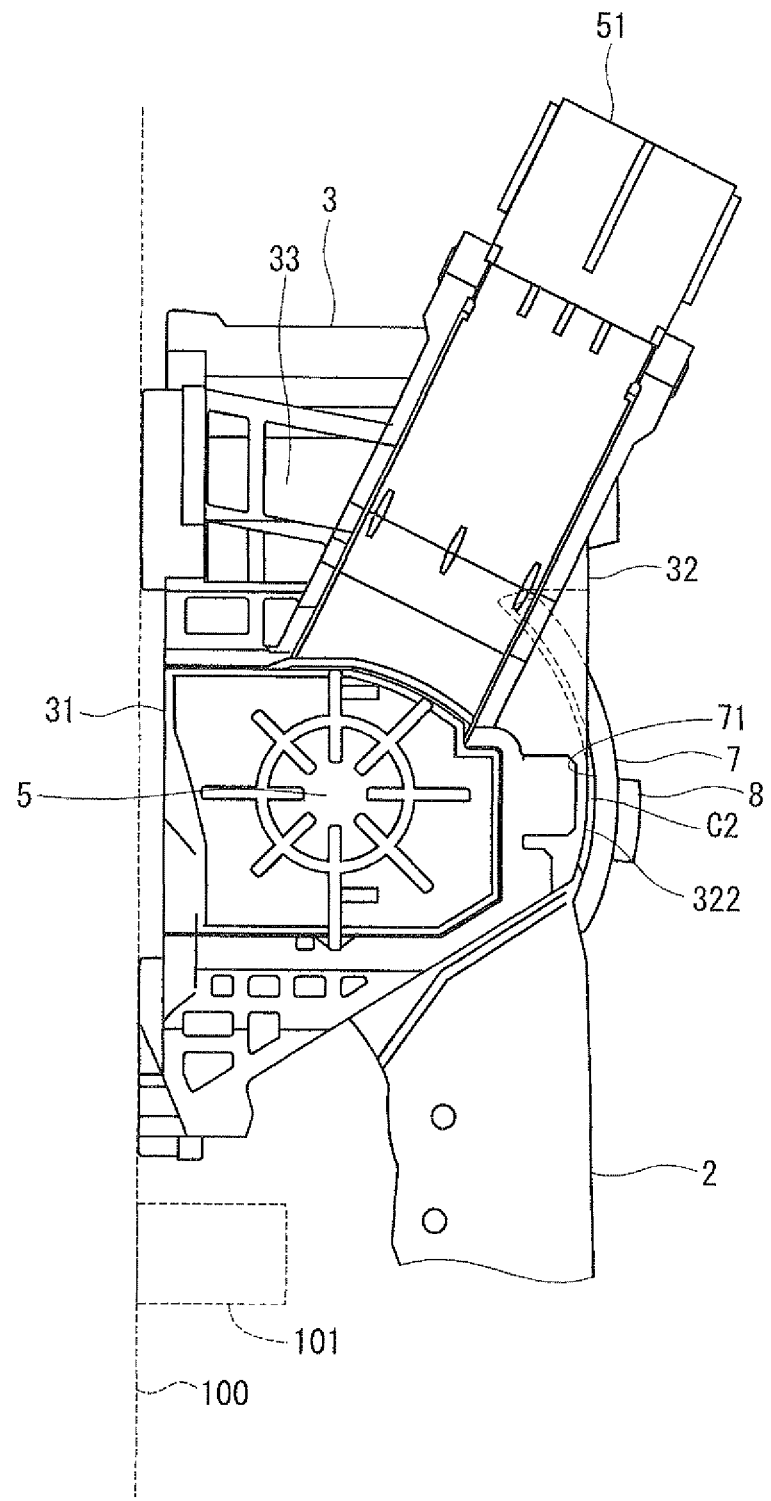
FIG. 8 is a view taken in a direction of an arrow VIII in FIG. 7.

In the present embodiment, the cover member 7 has a curved inner wall surface 71, which generally coincides with an imaginary cylindrical surface, which arcuately extends about the rotational axis of the accelerator pedal 2 (the shaft member 11). The top plate 32 of the support member 3 has a curved outer wall surface 322 at a location, which is adjacent to the limiting portion 321. The curved outer wall surface 322 is formed such that a predetermined clearance C2 is provided between the curved outer wall surface 322 and the curved inner wall surface 71 of the cover member 7 at any rotational position of the accelerator pedal 2 within the rotatable range of the accelerator pedal 2 (see FIGS. 6, 8 and 9).

The cover member 7 can limit the intrusion of the foreign objects into the gap S from the top plate 32 side throughout the entire rotatable range of the accelerator pedal 2.

Figure 7:
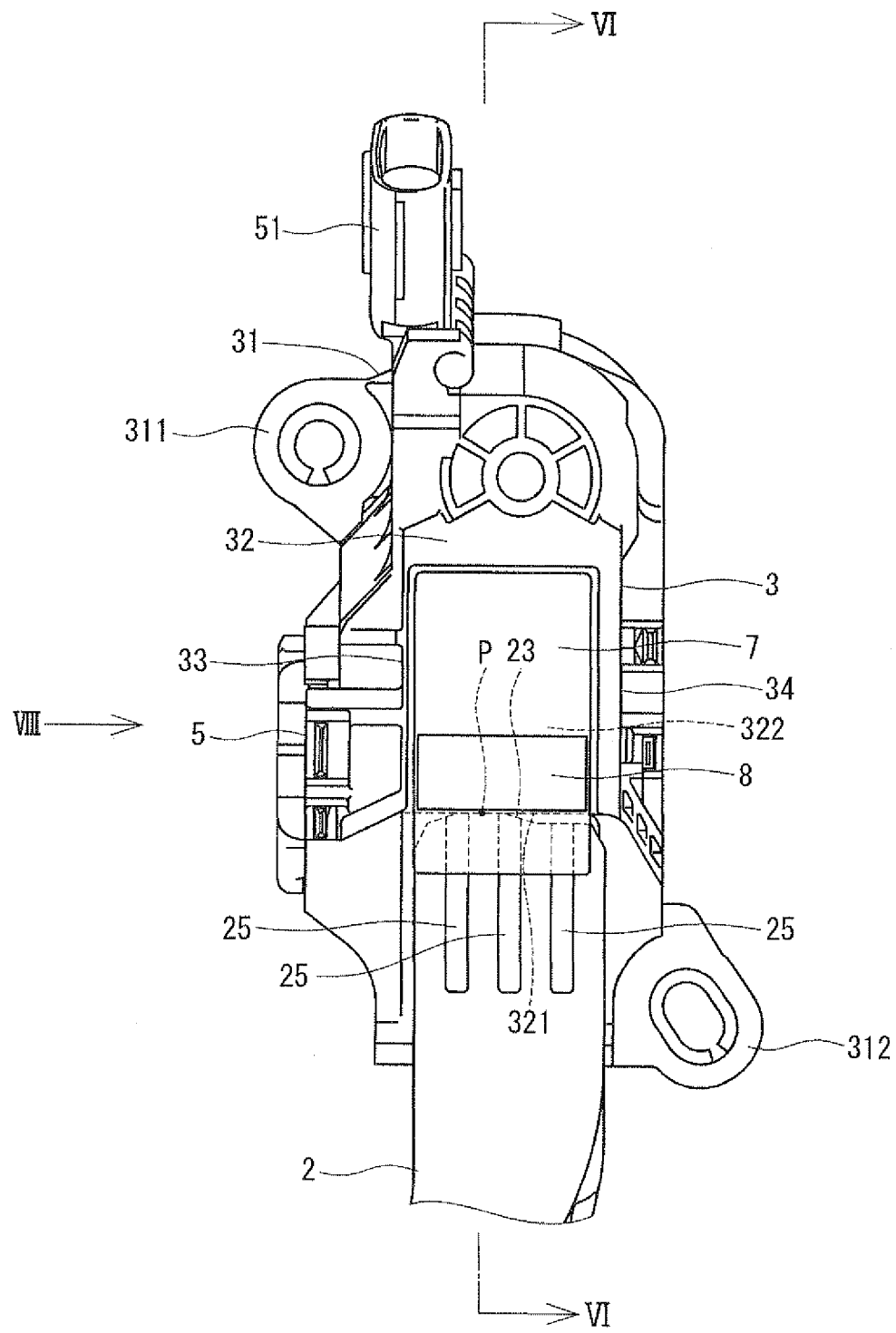
FIG. 7 is a view taken in a direction of an arrow VII in FIG. 6.
Figure 9:
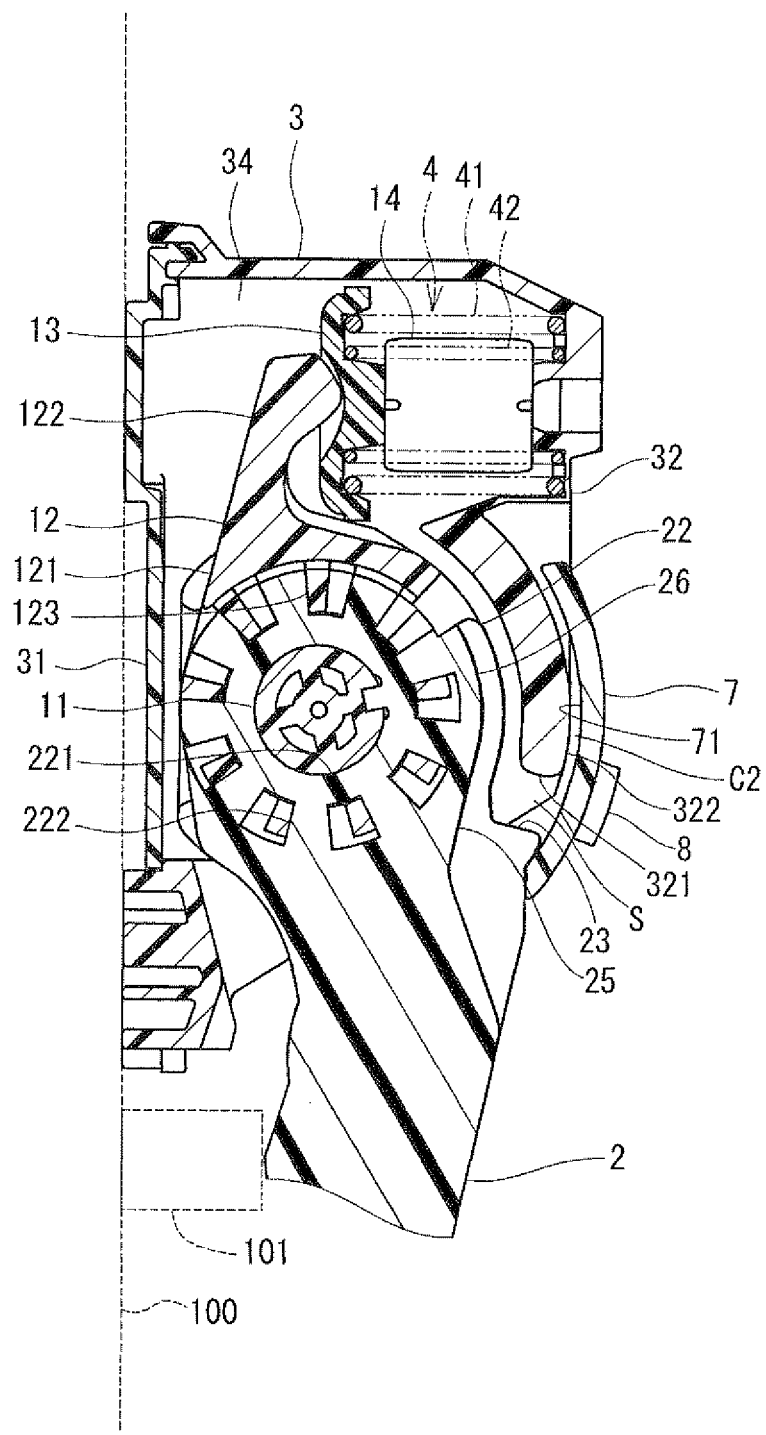
FIG. 9 is a cross-sectional view of the accelerator apparatus of the second embodiment, showing the accelerator pedal held in a full open position.

In the present embodiment, the grooves 25 are arranged such that at least the opposite end portion of each groove 25, which is opposite from the limiting portion 321, is exposed from the cover member 7 at any rotational position of the accelerator pedal 2 within the rotatable range of the accelerator pedal 2 (see FIGS. 6, 7 and 9). Thereby, even when the foreign objects are accumulated in the grooves 25, the foreign objects can be expelled from the grooves 25 through the exposed portions of the grooves 25, which are exposed from the cover member 7.

Also, in the present embodiment, the cleaning member 8 is installed to an opposite surface of the cover member 7, which is opposite from the gap S (see FIG. 9).

The cleaning member 8 of the present embodiment is similar to that of the first embodiment and is thereby formed as the brush.

Other than the above described points, the structure of the accelerator apparatus of the second embodiment is similar to that of the first embodiment.

As described above, in the present embodiment, the cover member 7 is provided such that the cover member 7 covers the gap S between the limiting portion 321 and the contacting portion 23 at any rotational position of the accelerator pedal 2 within the rotatable range of the accelerator pedal 2. When the driver depresses the accelerator pedal 2 with his/her foot through his/her shoe, the cover member 7 limits the intrusion of the foreign objects (e.g., sand, pebble), which adhere to, i.e., are attached to the shoe of the driver, into the gap S throughout the entire rotatable range of the accelerator pedal 2. Thereby, the capturing of the foreign objects between the limiting portion 321 of the support member 3 and the contacting portion 23 of the accelerator pedal 2 is limited. Therefore, it is possible to limit the occurrence of the jammed state of the accelerator pedal 2, in which the accelerator pedal 2 is kept in the depressed position in the absence of the application of the depressing force from the foot of the driver onto the accelerator pedal 2. Thereby, it is possible to improve the safety of the accelerator apparatus 1.

In the present embodiment, the cover member 7 has the curved inner wall surface 71, which generally coincides with the imaginary cylindrical surface that arcuately extends about the rotational axis of the accelerator pedal 2. In contrast, the support member 3 has the curved outer wall surface 322 at the location, which is adjacent to the limiting portion 321. The curved outer wall surface 322 is formed such that the predetermined clearance C2 is provided between the curved outer wall surface 322 and the curved inner wall surface 71 of the cover member 7 at any rotational position of the accelerator pedal 2 within the rotatable range of the accelerator pedal 2. With the above structure, the cover member 7 can effectively limit the intrusion of the foreign objects between the contacting portion 23 of the accelerator pedal 2 and the limiting portion 321 of the support member 3 throughout the entire rotatable range of the accelerator pedal 2. Furthermore, the rotation of the accelerator pedal 2 can be smoothened by the provision of the clearance C2.

Furthermore, in the present embodiment, the cleaning member 8, which is formed as the brush, is installed to the opposite surface of the cover member 7, which is opposite from the gap S. Thereby, even when the foreign objects (e.g., sand, pebble) adhere to the manipulating portion (the shoe in the present embodiment) of the driver, through which the driver manipulates the accelerator pedal 2, the cleaning member 8 can scrape off the foreign objects, which adhere to the manipulating portion (the shoe in the present embodiment) of the driver. Therefore, similar to the first embodiment, the capturing of the foreign objects between the contacting portion 23 and the limiting portion 321 can be more effectively limited.

(Third Embodiment)

Figure 10:
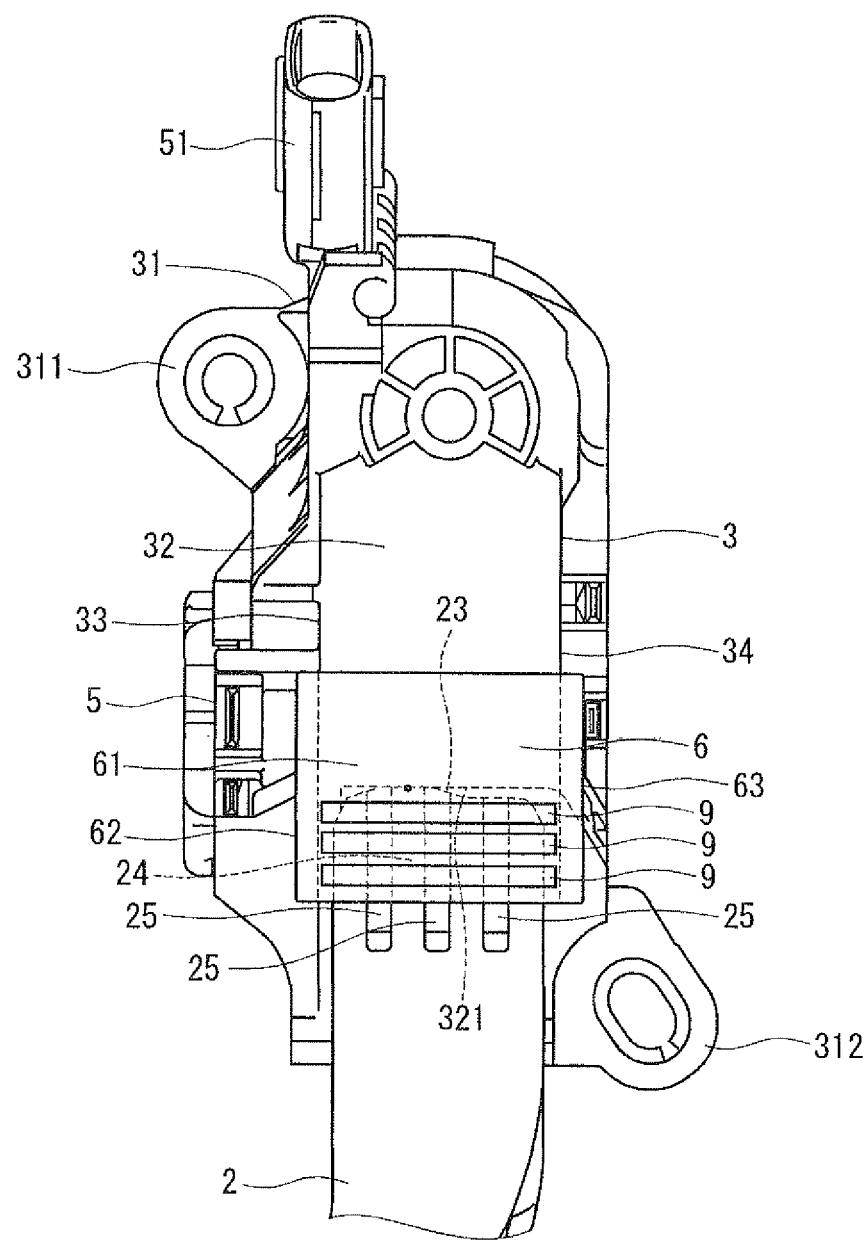
FIG. 10 is a top view of an accelerator apparatus according to a third embodiment of the present invention.

FIG. 10 shows an accelerator apparatus according to a third embodiment of the present invention. In the third embodiment, a shape and the number of cleaning members are different from those of the first embodiment.

As shown in FIG. 10, in the third embodiment, a width of each cleaning member 9, which is measured in a width direction (a top-to-bottom direction in FIG. 10) of the cleaning member 9, is shorter than that of the first embodiment. In the present embodiment, the number of the cleaning members 9 is three. These three cleaning members 9 are installed to the opposite surface of the cover member 6, which is opposite from the gap formed between the contacting portion 23 and the limiting portion 321, such that the cleaning members 9 are arranged one after another in the circumferential direction of the shaft member 11 (the circumferential direction around the rotational axis of the accelerator pedal 2) at predetermined intervals. Each cleaning member 9 is formed as a brush and is constructed in a manner similar to that of the cleaning member 8 of the first embodiment.

Other than the above described points, the structure of the accelerator apparatus of the third embodiment is similar to that of the first embodiment.

In the present embodiment, the multiple cleaning members 9 are installed to the cover member 6 such that the cleaning members 9 are arranged one after another at the predetermined intervals. Thereby, the scraping performance of the cleaning members 9, which scrape off the adhered foreign objects, is further improved, and the collecting performance of the cleaning members 9, which collect the foreign objects, is further improved.

Now, modifications of the above embodiments will be described.

As a modification of the above embodiments, as long as the cover member is arranged to cover the gap between the limiting portion and the contacting portion at any rotational position of the accelerator pedal within the rotatable range of the accelerator pedal, the cover member may be modified such that the cover member does not have the curved inner wall surface, which generally coincides with the imaginary cylindrical surface that arcuately extends about the rotational axis of the accelerator pedal. Furthermore, the accelerator pedal or the support member may be modified such that the accelerator pedal or the support member does not have the curved outer wall surface, which forms the predetermined clearance between the curved outer wall surface and the curved inner wall surface of the cover member.

Furthermore, the number of the grooves, which are formed in the contacting portion of the accelerator pedal, is not limited to three and may be modifies to one, two, four or more. Alternatively, the grooves may be eliminated from the contacting portion of the accelerator pedal.

Furthermore, in the above embodiments, the cover member is formed separately from the support member or the accelerator pedal. In another modification of the above embodiments, the cover member may be formed integrally with the support member or the accelerator pedal as one piece.

In the above embodiments, the cleaning member(s), which is installed to the cover member, is formed as the brush. In a modification of the above embodiments, the size of the cleaning member (the size of the base), the diameter and the length of each brush bristle and the density of the brush bristles may be set to any desired values. Furthermore, the material of the brush bristles is not limited to the resin material. For instance, the brush bristles may be made of, for example, a rubber material, hair of an animal or fibers of a plant.

Furthermore, in another modification of the above embodiments, the cleaning member(s) may be made of a pile fabric (e.g., carpet) or a synthetic resin foam material (e.g., sponge). Even in the case where the cleaning member(s) is made of the carpet or the sponge, it is possible to scrape off the foreign objects, which adhere to the manipulating portion (the shoe in the present embodiment) of the driver, through which the driver manipulates the accelerator pedal.

Furthermore, in a modification of the above embodiments, the cleaning member(s) may be made of an adhesive member, which is adhesive (a sticky member, which is sticky). With this modification, the adhesive cleaning member(s) can capture the foreign objects, which adhere to the manipulating portion (the shoe in the present embodiment) of the driver. For instance, the adhesive member may be an adhesive component, such as silicone rubber. Alternatively, the adhesive member may be a sheet member, to which an adhesive agent is coated.

In the first embodiment, the number of the cleaning member, which is installed to the cover member, is one. In the third embodiment, the number of the cleaning members, which are installed to the cover member, is three. However, the number of the cleaning member(s) is not limited to one or three and may be set to any desired number. Furthermore, the shape of the cleaning member(s) is not limited to the oblong rectangular shape and may be changed to any other suitable shape, such as a polygonal shape, a circular shape, an elliptical shape. Furthermore, as long as the cleaning member(s) are installed to the opposite surface of the cover member, which is opposite from the gap between the contacting portion of the cover member and the limiting portion, the cleaning member(s) may be installed to any location. Furthermore, in another modification of the above embodiment(s), the cleaning member(s) may be eliminated from the cover member.

Furthermore, in another modification of the present invention, the opposed surface of the contacting portion of the accelerator pedal, which is opposed to the limiting portion, may be formed as a planar surface.

In the above embodiments, the rotation of the accelerator pedal in the depressing direction is limited by the stopper, which is installed to the wall surface of the vehicle. In another modification of the above embodiments, the stopper may be provided to the accelerator apparatus side by, for example, forming the stopper integrally with the bottom plate of the support member. In such a case, the stopper becomes one of the constituent components of the accelerator apparatus.

Additional advantages and modifications will readily occur to those skilled in the art. The invention in its broader terms is therefore not limited to the specific details, representative apparatus, and illustrative examples shown and described.

What is claimed is:

1. An accelerator apparatus for a vehicle, comprising:
   an accelerator pedal that is adapted to be depressed in a depressing direction by a driver of the vehicle;
   a support member that is adapted to be installed to the vehicle and rotatably supports the accelerator pedal, wherein:
     the support member includes a limiting portion that limits rotation of the accelerator pedal in an opposite direction, which is opposite from the depressing direction, when a contacting portion of the accelerator pedal contacts the limiting portion; and
     the limiting portion forms a gap between the contacting portion and the limiting portion in a state where the accelerator pedal is rotated in the depressing direction;
   an urging member that urges the accelerator pedal in the opposite direction, which is opposite from the depressing direction;
   a rotational position sensor that senses a rotational position of the accelerator pedal; and
   a cover member that is provided to one of the support member and the accelerator pedal and covers the gap at any rotational position of the accelerator pedal within a rotatable range of the accelerator pedal, wherein:
     the accelerator pedal includes at least one groove that extends from an opposed surface of the contacting portion, which is opposed to the limiting portion, along the accelerator pedal in a direction opposite from the limiting portion; and
     at least an end part of the at least one groove, which is opposite from the limiting portion, is exposed from the cover member at any rotational position of the accelerator pedal within the rotatable range of the accelerator pedal.

2. The accelerator apparatus according to claim 1, wherein:
   the cover member is provided to the support member and includes a curved inner wall surface, which generally coincides with an imaginary cylindrical surface that arcuately extends about a rotational axis of the accelerator pedal; and
   the accelerator pedal has a curved outer wall surface, which is located adjacent to the contacting portion and forms a predetermined clearance between the curved inner wall surface of the cover member and the curved outer wall surface of the accelerator pedal at any rotational position of the accelerator pedal within the rotatable range of the accelerator pedal.

3. The accelerator apparatus according to claim 1, wherein:
   the cover member is provided to the accelerator pedal and includes a curved inner wall surface, which generally coincides with an imaginary cylindrical surface that arcuately extends about a rotational axis of the accelerator pedal; and
   the support member has a curved outer wall surface, which is located adjacent to the limiting portion and forms a predetermined clearance between the curved inner wall surface of the cover member and the curved outer wall surface of the support member at any rotational position of the accelerator pedal within the rotatable range of the accelerator pedal.

4. The accelerator apparatus according to claim 1, wherein the at least one groove includes a plurality of grooves.

5. The accelerator apparatus according to claim 1, further comprising at least one cleaning member that is provided to an opposite surface of the cover member, which is opposite from the gap, wherein the at least one cleaning member is adapted to scrape off or collect a foreign object, which is attached to a manipulating portion of the driver, through which the driver manipulates the accelerator pedal.

6. The accelerator apparatus according to claim 5, wherein the at least one cleaning member includes a plurality of cleaning members, which are arranged one after another at predetermined intervals.

7. The accelerator apparatus according to claim 5, wherein each cleaning member is one of a brush, a carpet, a sponge and an adhesive member having an adhesive property.

* * * * *